(12) United States Patent
Rundell

(10) Patent No.: US 6,320,881 B1
(45) Date of Patent: Nov. 20, 2001

(54) METHOD, ARCHITECTURE AND CIRCUIT FOR LOCKING A DATA TRANSMISSION FRAME

(75) Inventor: Robert G. Rundell, Kirkland, WA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/104,557

(22) Filed: Jun. 25, 1998

(51) Int. Cl.[7] ............................... H04J 3/06; H04L 7/00; H03D 3/24

(52) U.S. Cl. ................. 370/514; 370/509; 370/515; 370/516; 375/357; 375/373; 375/376

(58) Field of Search ................... 370/514, 105, 370/110, 515, 516; 375/340, 376, 108, 224, 282, 259, 289; 331/14, 10, 16, 18, 25

(56) References Cited

U.S. PATENT DOCUMENTS

| | | | |
|---|---|---|---|
| 4,577,319 | * 3/1986 | Takeuchi | 371/30 |
| 4,641,326 | * 2/1987 | Tomisawa | 375/108 |
| 4,979,192 | * 12/1990 | Shimizume et al. | 375/111 |
| 5,410,571 | * 4/1995 | Yonekawa et al. | 375/376 |
| 5,483,558 | * 1/1996 | Leon et al. | 375/376 |
| 5,570,394 | * 10/1996 | Tsurumaki | 375/340 |
| 5,576,665 | * 11/1996 | Erhage | 331/14 |
| 5,675,813 | 10/1997 | Holmdahl | 395/750 |

FOREIGN PATENT DOCUMENTS 9736230   10/1997   (WO) .

OTHER PUBLICATIONS

Universal Serial Bus Specification, Chapter 7—Electrical, Jan. 15, 1996, pp. 111–143.

* cited by examiner

*Primary Examiner*—Wellington Chin
*Assistant Examiner*—M. Phan
(74) *Attorney, Agent, or Firm*—Christopher P. Maiorana, P.C.

(57) ABSTRACT

A circuit comprising a first counter, a second counter, a third counter and a decoder, where the decoder may be configured to present a locked output signal. The first counter may present a first output signal in response to a start of frame signal and one or more control signals. The second counter may be configured to present a second output signal in response to the start of frame signal and the first output signal. The third counter may present a tracking control signal to the first counter in response to one or more of the control signals.

19 Claims, 6 Drawing Sheets

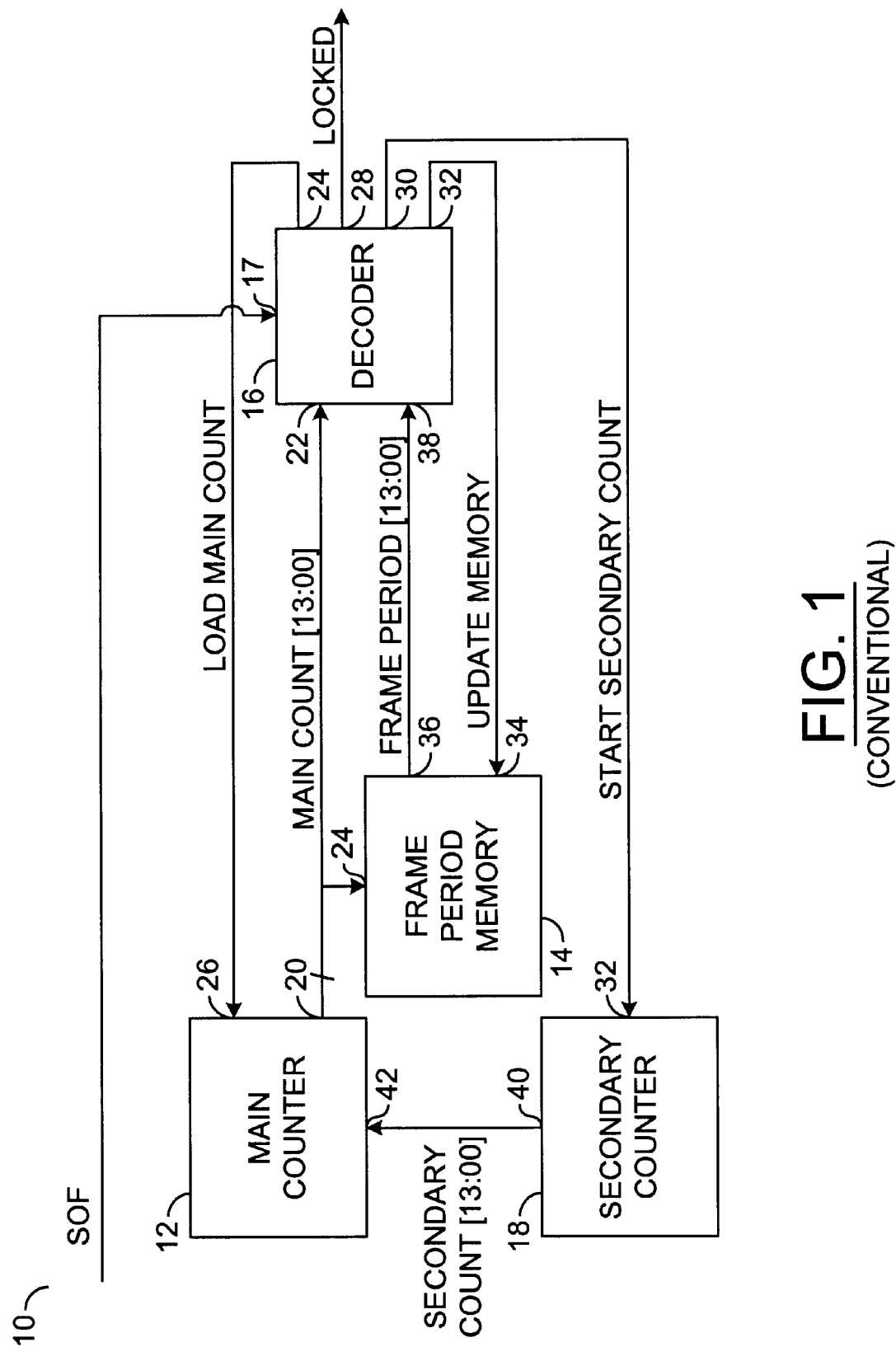
FIG. 1
(CONVENTIONAL)

METHOD, ARCHITECTURE AND CIRCUIT FOR LOCKING A DATA TRANSMISSION FRAME

FIELD OF THE INVENTION

The present invention relates to counters and tracking protocols generally and, more particularly, to a method, architecture and circuit for locking a data transmission frame.

BACKGROUND OF THE INVENTION

In a universal serial bus (USB) protocol, a start of frame (SOF) packet is transmitted once every 12,000±45 bit times. A full speed USB device (as opposed to a low speed USB device) must track this SOF packet to ensure a period is within two bit times of the previous period. The USB protocol allows for two SOF packets to be missed. However, if a third packet is missed, the device is not locked and may not properly respond to USB traffic.

One conventional approach for implementing such a mechanism would be to implement an arithmetic incremental counter with a memory used to store the previous frame period and an arithmetic, subtractive comparator to decoder whether the frame period was within an acceptable time length. In addition, since a SOF indicator may be missed, the second counter is needed to start counting the period in the frame from the point at which it was expected to start. In addition, the second count value must be loaded into the main counter at some point during the frame count.

The overall operation is controlled by the decoder, which keeps track of whether the device is locked to the SOF signal or not. The decoder must also decode the range of allowable occurrences of the SOF signal and then use this information to control the counters and the count memory. Since several such ranges are needed to perform all of this control functionality, multiple comparators would be required. The standard method requires arithmetic functions, specifically incrementors and comparators, which are large and slow.

Referring to FIG. 1, a circuit 10 is shown illustrating a conventional method of tracking a SOF packet. The circuit 10 generally comprises a main counter 12, a frame period memory 14, a decoder 16, and a secondary counter 18. The main counter 12 has an output 20 that may present a multi-bit signal MAINCOUNT to an input 22 of the decoder 16 as well as to an input 24 of the frame period memory 14. The decoder 16 has an output 24 that presents a signal LOADMAINCOUNT back to an input 26 of the main counter 12. The SOF signal is generally presented to an input 17 of the decoder 16. The decoder 16 also has an output 28 that presents a signal that may indicate when the tracker is locked to the host transmitter via the SOF indicator, an output 30 that presents a signal STARTSECONDARY-COUNT to an input 32 of the secondary counter 18 and an output 32 that presents a signal to an input 34 of the frame period memory 14 that indicates when the memory should be updated. The frame period memory 14 also has an output 36 that may present a multi-bit signal FRAMEPERIOD [13:00] to an input 38 of the decoder. The secondary counter 18 has an output 40 that may present a multi-bit signal SECONDARYCOUNT [13:00] to an input 42 of the main counter 12.

SUMMARY OF THE INVENTION

The present invention concerns a circuit comprising a first counter, a second counter, a third counter and a decoder, where the decoder may be configured to present a locked output signal. The first counter may present a first output signal in response to a start of frame signal and one or more control signals. The second counter may be configured to present a second output signal in response to the start of frame signal and the first output signal. The third counter may present a tracking control signal to the first counter in response to one or more of the control signals.

The objects, features and advantages of the present invention include providing a SOF tracker that (i) may implement LSFR counters to simplify counting and decoding, (ii) may be implemented using less logic which may result in faster circuits using less area, (iii) may allow the implementation of decoders rather than comparators, and (iv) may replace a memory with a smaller tracking counter.

BRIEF DESCRIPTION OF THE DRAWINGS

These and other objects, features and advantages of the present invention will be apparent from the following detailed description and the appended claims and drawings in which:

FIG. 1 is a block diagram of a conventional SOF counter;

DETAILED DESCRIPTION OF THE PREFERRED EMBODIMENTS

Figure 2:
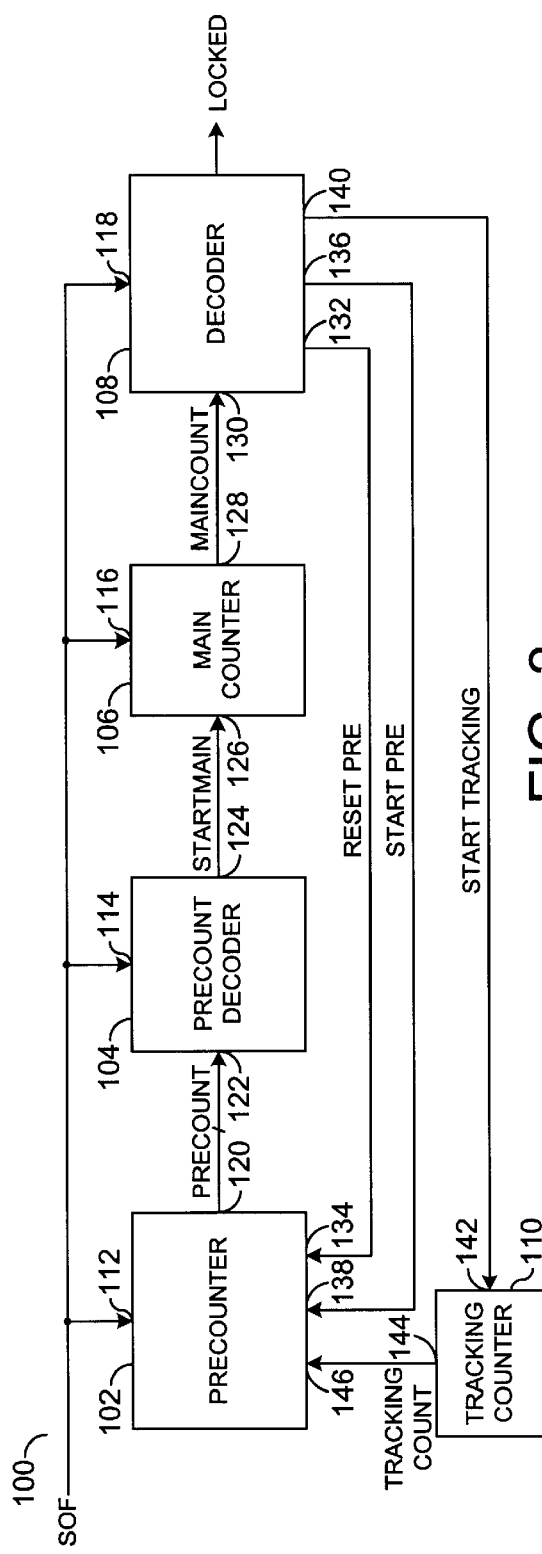
FIG. 2 is a block diagram of a preferred embodiment of the present invention.

Referring to FIG. 2, a block diagram of a circuit 100 is shown in accordance with a preferred embodiment of the present invention. The circuit 100 generally comprises a precounter 102, a precount decoder 104, a main counter 106, a decoder 108, and a tracking counter 110. A start of frame signal (e.g., SOF) may be presented to an input 112 of the precounter 102, to an input 114 of the precount decoder 104, to an input 116 of the main counter 106, and to an input 118 of the decoder 108. The precounter 102 may have an output 120 that may present a multi-bit signal (e.g., PRECOUNT [7:0]) to an input 122 of the precount decoder 104. The precount decoder 104 may have an output 124 that may present a signal (e.g., STARTMAIN) to an input 126 of the main counter 106. The main counter 106 may have an output 128 that may present a multi-bit signal (e.g., MAINCOUNT [13:0]) to an input 130 of the decoder 108. The decoder 108 may have an output 132 that may present a signal (e.g., RESETPRE) to an input 134 of the precounter 102, an output 136 that may present a signal (e.g., STARTPRE) to an input 138 of the precounter 102, and an output 140 that may present a signal (e.g., STARTTRACKING) to an input 142 of the tracking counter 110. The tracking counter 110 may have an output 144 that may present a signal (e.g., TRACKINGCOUNT) to an input 146 of the precounter 102.

The circuit 100 may implement two features for frame tracking and locking. The precounter 102 and the main counter 106 may be implemented as Linear Shift Feedback Registers (LSFR). However, other types of counters may be implemented in accordance with particular design criteria. In general, if the precounter 102 is implemented with an LSFR, then the tracking counter must also be implemented as an LSFR. If LSFRs are used, a smaller and faster implementation may generally be accomplished when compared with traditional incremental counters. In addition, the precounter 102 may simplify the decoding of the main counter 106 as well as reduce the memory requirements for keeping track of a previous count.

The signal PRECOUNT may be a multi-bit value presented to the input 122 that may be decoded to indicate when to start the main counter 106 counting period. This decode can be of a fixed value, which may make the overall implementation of the circuit 100 much simpler. By implementing the precounter 102, the main counter 106 may be used to count a fixed period, making the decoding of the main counter 106 much simpler. For example, the main counter 106 may be implemented as an LSFR with a fixed count. Similar to the conventional approach discussed in the background section, the decoder 108 generally has the burden of controlling the precounter 102, the tracking counter 110, and keeping track of whether the USB device is locked.

The tracking counter 110 may replace both the memory 14 and the secondary counter 18 of the conventional approach described in the background section. The tracking counter 110 may also be, in one example, implemented as an LSFR counter, having a count sequence that may be backward (e.g., high to low) from that of the precounter 102. In general, if the precounter 102 is implemented as an LSFR, then the tracking counter 110 must also be an LSFR. For example, the precounter 102 generally counts down from a value which the tracking counter 110 has counted up. The decoder 108 must generally start the precounter 102 at the expected time of the SOF, and also restart if an SOF comes at a different time (e.g., an unexpected SOF). If this unexpected SOF is still within the allowable range, the decoder 108 may present the signal RESETPRE to the precounter 102 that may initiate a count using the value stored in the tracking counter 110. Otherwise, the decoder 108 will signal the precounter 102 to reset to a default count and to begin to count.

Figure 3:
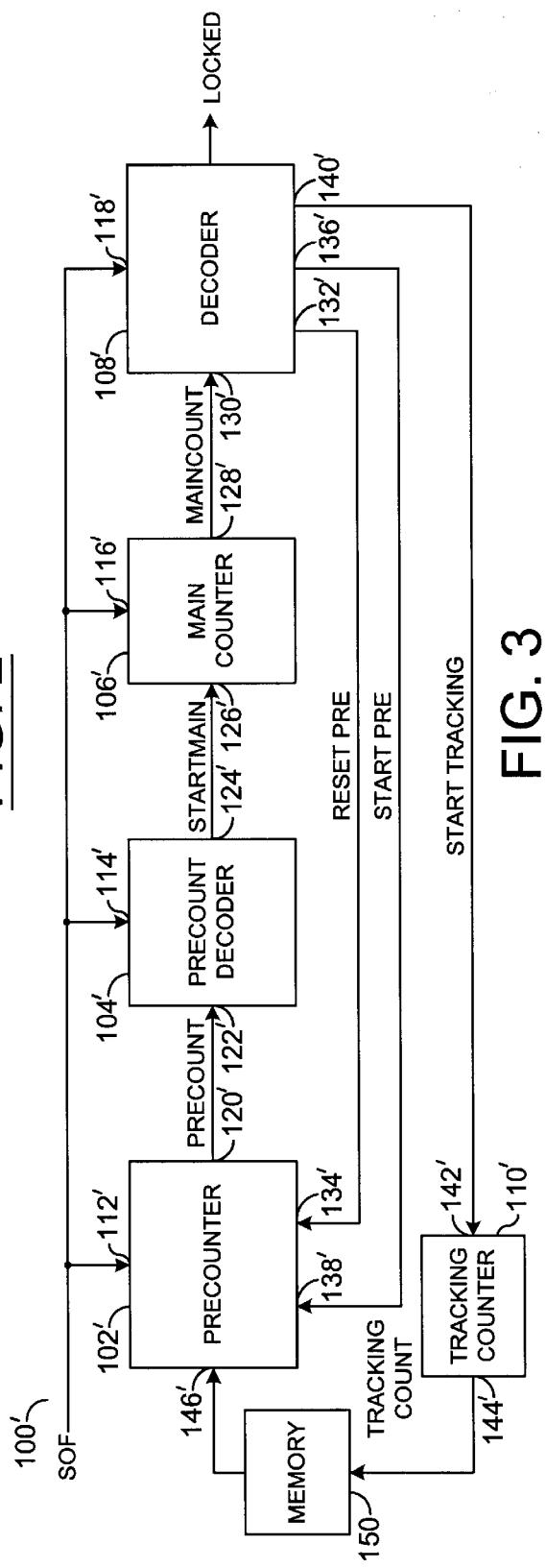
FIG. 3 is an alternate implementation of a preferred embodiment of the present invention.

Referring to FIG. 3, an alternate implementation of the present invention is shown. The alternate implementation 100' further comprises a memory 150. The memory 150 may operate as a buffer between the tracking counter 110' and the precounter 102' for storing count information.

Figure 4:
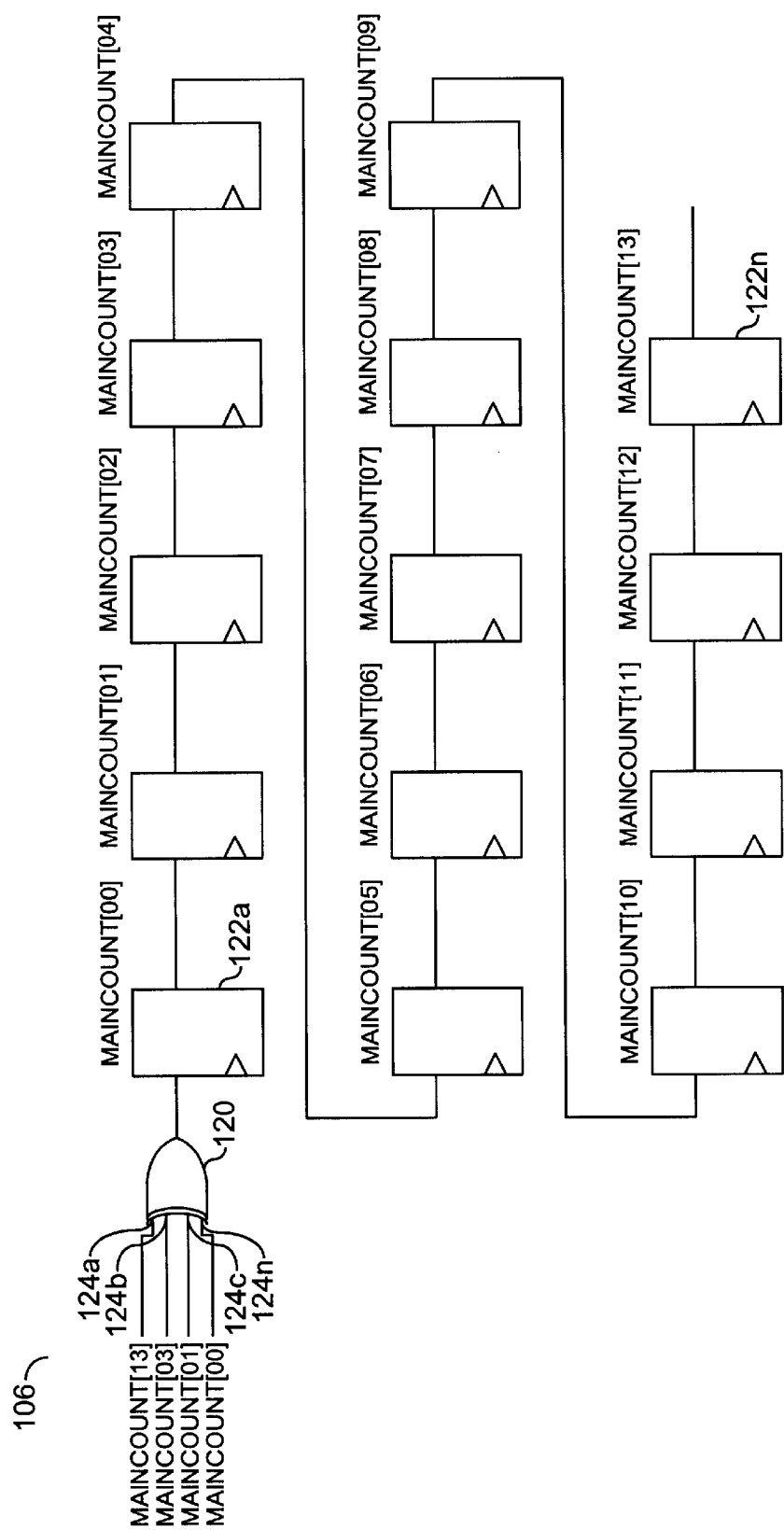
FIG. 4 is a more detailed diagram of the main counter.

Referring to FIG. 4, a more detailed diagram of the main counter 106 is shown comprising a gate 120 and a number of counter elements 122a–122n. The example in FIG. 4 illustrates 14 counter elements 122a–122n (i.e., a 14-bit counter) each presenting a count signal (e.g., MAINCOUNT [00–13]). However, the particular number of counter elements 122a–122n may be adjusted accordingly to meet the design criteria of a particular application. The gate 120 may be implemented, in one example, as an exclusive OR gate that may have a number of inputs 124a–124n. Each of the inputs 124a–124n may receive a signal from one of the counter elements 122a–122n. For example, the input 124a may receive the count signal MAINCOUNT[13], the input 124b may receive the signal MAINCOUNT[03], the input 124c may receive the signal MAINCOUNT[01], and the input 124n may receive the signal MAINCOUNT[00]. The output signal MAINCOUNT[13] may present the signal MAINCOUNT [0:13] at the output 128 shown in FIG. 2. The counter elements 122a–122n may be implemented as, in one example, a number of flip-flops. However, other elements may be used to implement the counter elements 122a–122n.

Figure 5:
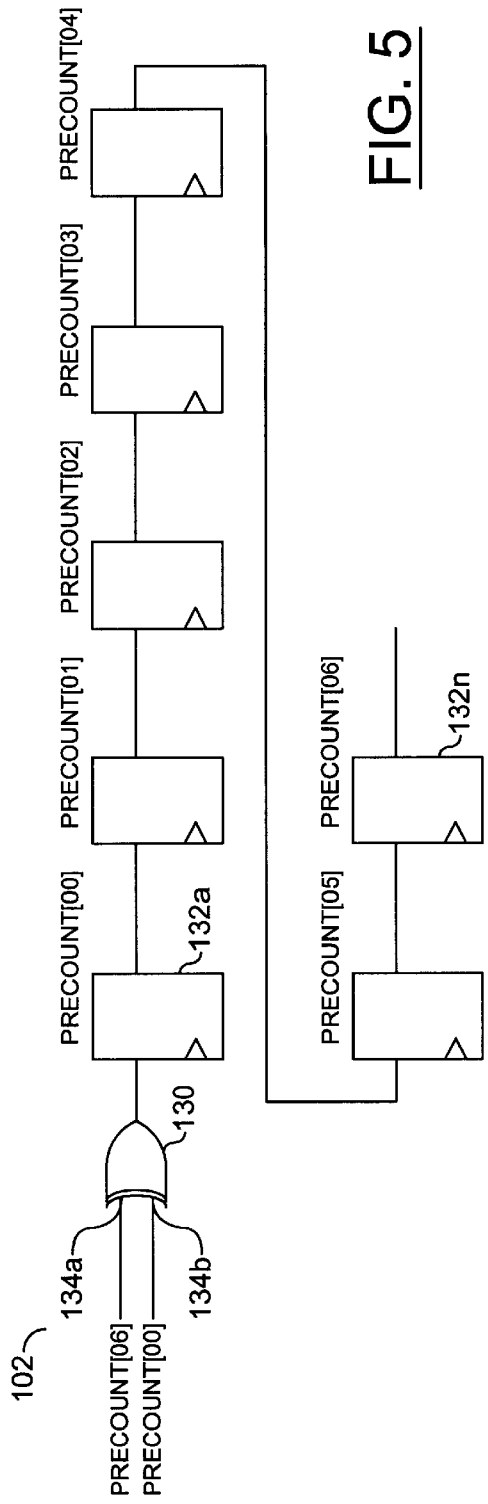
FIG. 5 is a more detailed diagram of the precounter.

Referring to FIG. 5, a more detailed diagram of the precounter 102 is shown comprising a gate 130 and a number of counter elements 132a–132n. Each of the counter elements 132a–132n presents a number of count signals PRECOUNT[00–06]. The gate 130, which may be implemented, in one example, as an exclusive OR gate that may have an input 134a that may receive the signal PRECOUNT[06] from the counter element 132n and an input 134b that may receive the signal PRECOUNT[00] from the counter element 132a. The counter elements 132a–132n may be implemented as, in one example, a number of flip-flops. However, other elements may be used to implement the counter elements 132a–132n.

Figure 6:
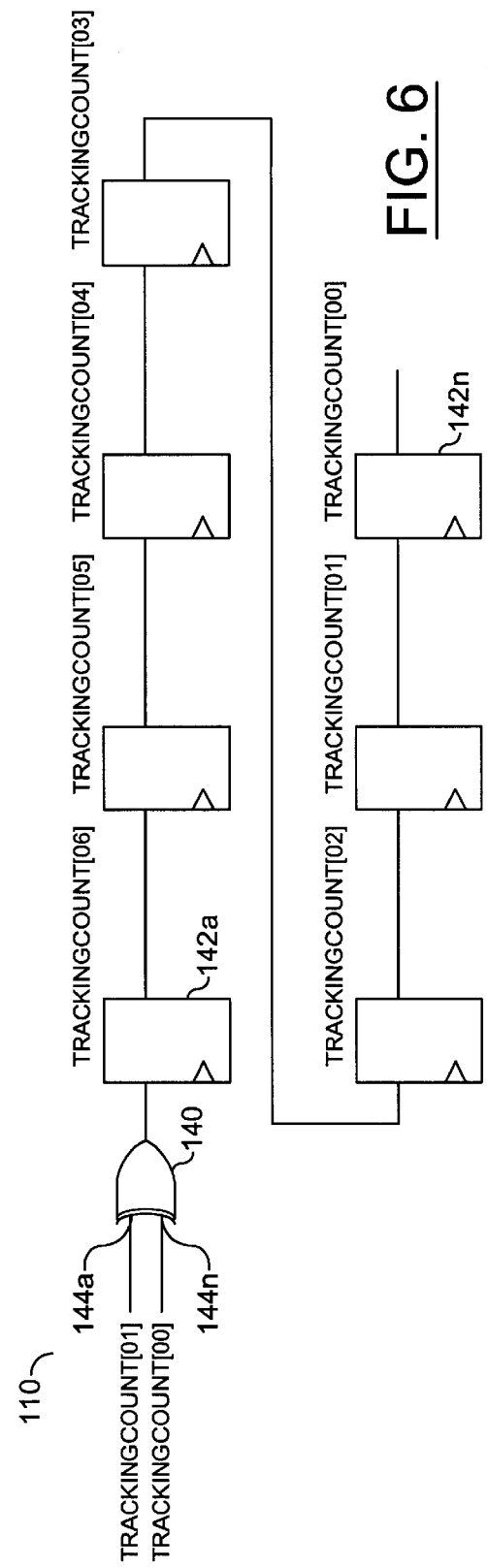
FIG. 6 is a more detailed diagram of the tracking counter.

Referring to FIG. 6, a more detailed diagram of the tracking counter 110 is shown comprising a gate 140 and a number of counter elements 142a–142n. Each of the counter elements 142a–142n presents a number of count signals (e.g., TRACKINGCOUNT[00–06]). The gate 140, which may be implemented as an exclusive OR gate, has an input 144a that may receive the signal TRACKINGCOUNT[01] from the counter element 142(n-1) and an input 144n that may receive the signal TRACKINGCOUNT[00] from the counter element 142n. The counter elements 142a–142n may be implemented as, in one example, flip-flops. However, other elements may be used to implement the counter elements 142a–142n. The inputs 144a and 144n may be selected from the counter elements 142a–142n by testing the various inputs to find the combination that provided the longest cycle. Similarly, the inputs 134a and 134b to the gate 130 as well as the inputs 124a–124n of the gate 120 may be similarly selected.

Figure 7A:
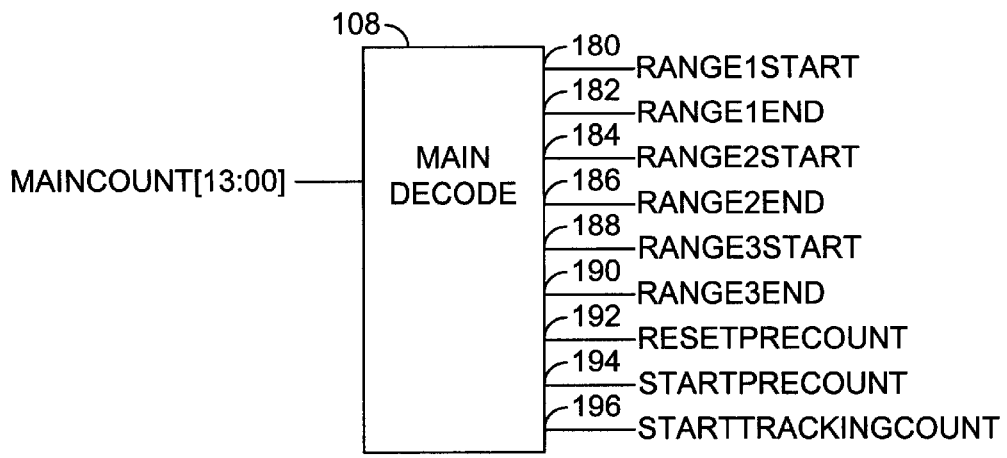
FIGS. 7a–7c are more detailed diagrams of the decoder.

Referring to FIG. 7a, a more detailed diagram of the main decoder 108 is shown. The main decoder 108 is shown having an output 180 that may present a range start signal (e.g., RANGE1START), and output 182 that may present a range end signal (e.g., RANGE1END) an output 184 that may present a range start signal (e.g., RANGE2START), an output 186 that may present a range end signal (e.g., RANGE2END), the output 188 that may present a range start signal (e.g., RANGE3START), an output 190 that may present a range end signal (e.g., RANGE3END), an output 192 that may present a reset signal (e.g., RESETPRECOUNT), an output 194 that may present a start signal (e.g., STARTPRECOUNT) and an output 196 that may present a tracking signal (e.g., STARTTRACKINGCOUNT).

Figure 7C:
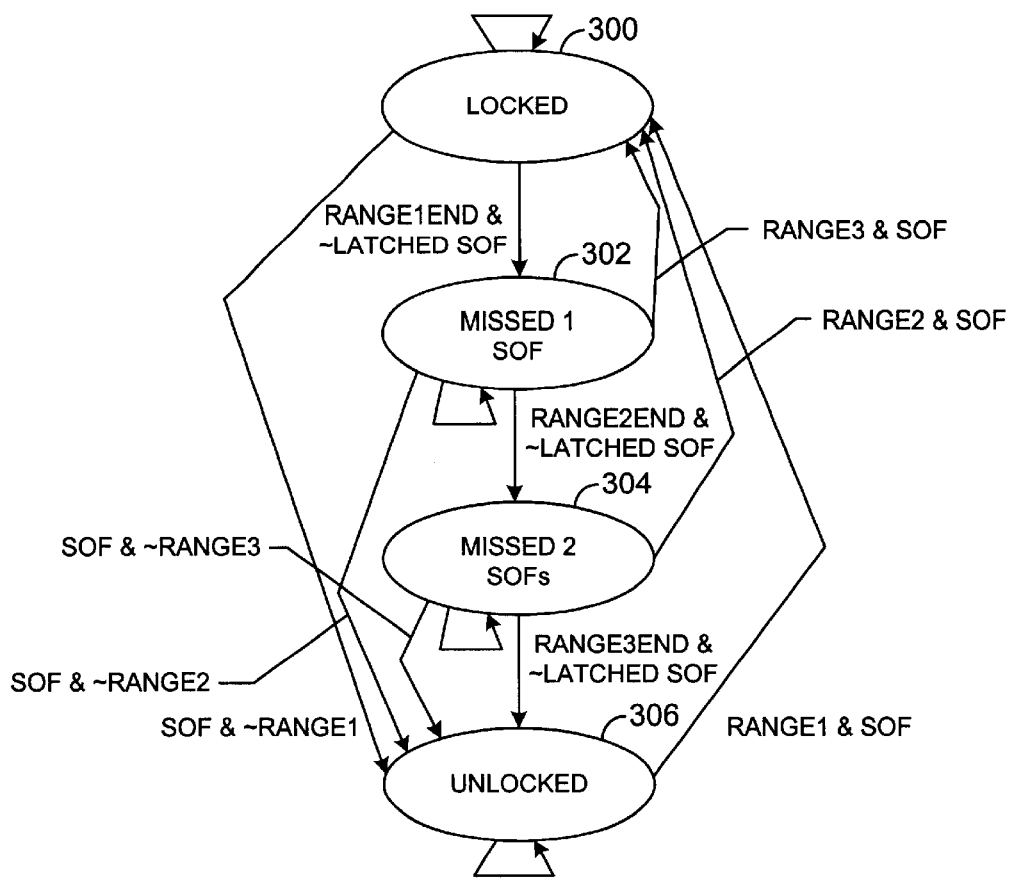
Figure 7B:
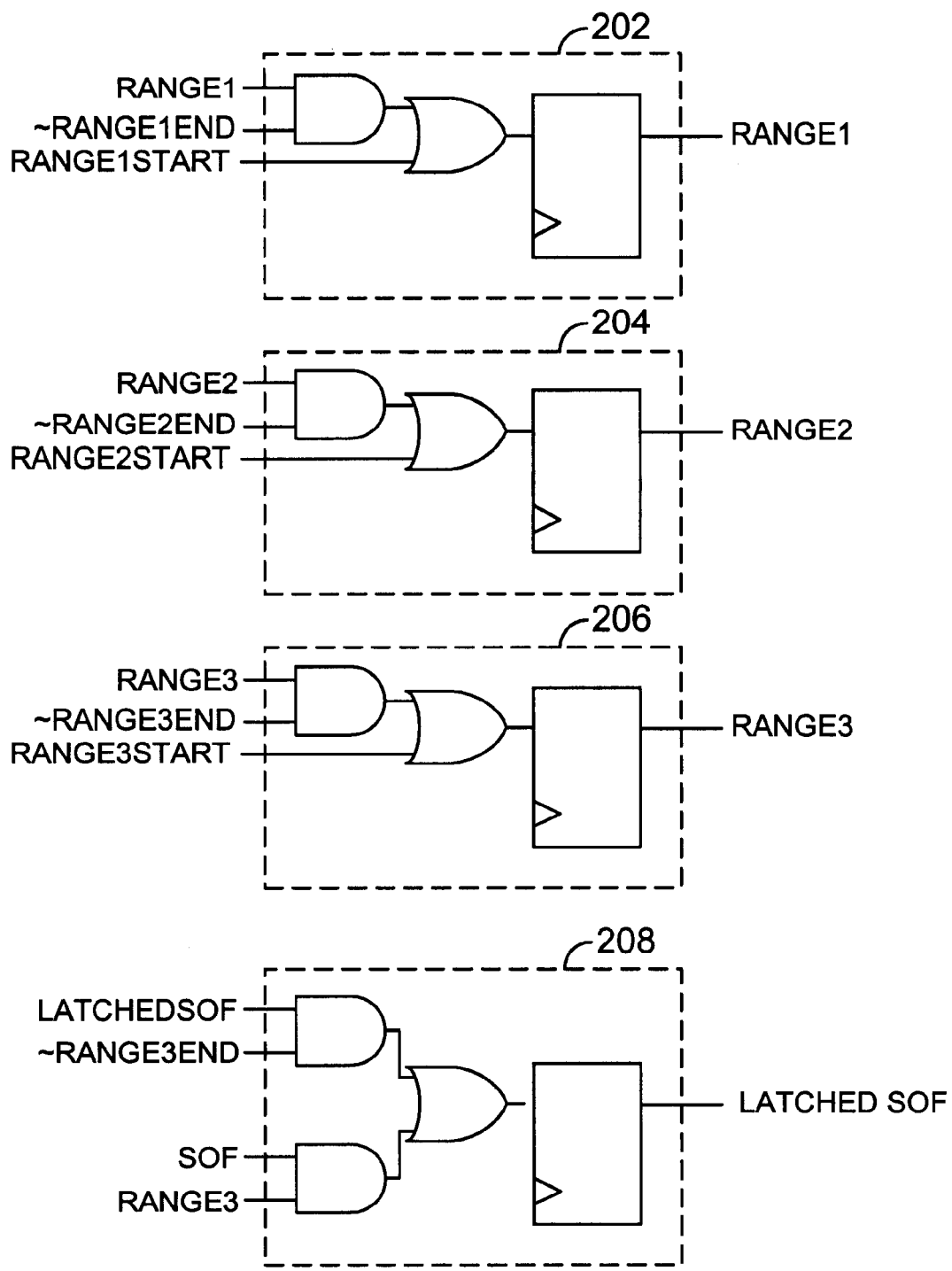

Referring to FIG. 7b, a more detailed diagram of circuitry that may be used to generate the outputs 180–196 of the main decoder 108 is shown. A first generation block 202 is shown receiving the signal RANGE1, a signal ~RANGE1END (which may be a logical inversion of the signal RANGE1END) and the signal RANGE1START. An element 204 is shown receiving the signal RANGE2, a signal ~RANGE2END (which may be a logical inversion of the signal RANGE2END), and the signal RANGE2START. An element 206 is shown receiving the signal RANGE3, a signal ~RANGE3END (which may be a logical inversion of RANGE3END), and the signal RANGE3START. An element 208 is shown receiving a signal LATCHEDSOF, the signal ~RANGE3END, the signal SOF and the signal RANGE3.

Referring to FIG. 7c, a state diagram illustrating an example of main decoder logic is shown. The logic may be implemented in discrete logic, a programming language (such as verilog hardware description language (HDL) as defined by the IEEE 1364–1995 standard) or any other appropriate implementation. The state diagram generally comprises a locked state 300, a missed one SOF state 302, a missed two SOF state 304 and an unlocked state 306. The logic generally remains in the locked state 300 and monitors for a SOF within a range of the time RANGE1. The state machine generally starts in the unlocked state 306. When the SOF indicator is seen within the RANGE1 span of time, the state machine will generally move into the locked state 300 and may be considered to be locked. In general, in a normal operation the state machine will start in the unlocked state 306 and then, a short time after the host starts transmitting (e.g., approximately 3 ms), the SOF indicator will enter the locked state 300, where it generally remains for the remainder of the normal, unsuspended operation of the device. When the state 300 sees an SOF during the time RANGE1, the system remains in the locked state 300. From then on, the system will continue to expect that particular SOF marker to occur. If the SOF is not seen one time, the logic enters the state 302. If a second SOF is received within the time frame RANGE2, the logic enters the state 304. If a third SOF is missed, the logic moves to the unlocked state 306. While in the particular states 302, 304 and 306, if an SOF is received outside of the defined ranges, the system returns to the state 306 and becomes unlocked, repeating the process.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:
    a first counter configured to present a first output signal in response to an input signal and one or more control signals;
    a second counter configured to present a second output signal in response to said first output signal and said input signal; and
    a decoder configured to present (i) a locked output signal configured to be de-asserted in response to said input signal not being detected a predetermined number of times and (ii) said one or more control signals in response to said second output signal and said input signal, wherein said locked output signal indicates a data transmission frame is locked; and
    a third counter configured to present a tracking control signal to said first counter in response to one or more of said control signals.

2. The circuit according to claim 1, wherein said first counter comprises a precounter and said second counter comprises a main counter.

3. The circuit according to claim 1, wherein said third counter comprises a tracking counter.

4. The circuit according to claim 1, further comprising a second decoder configured to decode said first output signal in response to said input signal and said first output signal.

5. The circuit according to claim 1, wherein said input signal comprises a start of frame signal.

6. The circuit according to claim 1, further comprising a memory coupled between said first counter and said third counter, said memory configured to store information received from said third counter.

7. The circuit according to claim 1, wherein said decoder comprises a state machine configured to generate said locked output signal and said one or more control signals.

8. The circuit according to claim 3, wherein said tracking counter and said first counter increment in opposite directions.

9. The circuit according to claim 1, wherein said first output signal is a multi-bit signal and said second output signal is a multi-bit signal.

10. A circuit comprising:
    means for generating a first counter output signal in response to an input signal and one or more control signals;
    means for generating a second output counter signal in response to said first output signal and said input signal;
    means for generating (i) a locked output signal configured to be de-asserted in response to said input signal not being detected a predetermined number of times and (ii) said one or more control signals in response to said second output signal and said input signal, wherein said locked output signal indicates a data transmission frame is locked; and
    means for generating a tracking control signal to said first counter in response to one or more of said control signals.

11. A method for locking a data transmission frame comprising the steps of:
    (A) generating a first counter output signal in response to an input signal and one or more control signals;
    (B) generating a second output counter signal in response to said first counter output signal and said input signal;
    (C) generating (i) a locked output signal configured to be de-asserted in response to said input signal not being detected a predetermined number of times and (ii) said one or more control signals in response to said second output signal and said input signal, wherein said locked output signal indicates a data transmission frame is locked; and
    (D) generating a tracking control signal in response to one or more of said control signals.

12. The method according to claim 11, further comprising the step of:
    (E) decoding said first counter output signal in response to said input signal and said first output signal.

13. The method according to claim 11, wherein said input signal comprises a start of frame signal.

14. The method according to claim 11, wherein step (B) comprises generating said locked output signal and said one or more control signals using a state machine.

15. The circuit according to claim 1, wherein said first counter, said second counter and said third counter are implemented as linear shift feedback registers.

16. The circuit according to claim 1, wherein said decoder is configured to start said first counter at a time when said input signal is expected.

17. The circuit according to claim 16, wherein said decoder circuit is configured to restart said first counter in response to receiving said input signal at a time different from an expected time.

18. The circuit according to claim 17, wherein said first counter is restarted using a value stored in said third counter.

19. The circuit according to claim 17, wherein said first counter is restarted using a predetermined default value.

* * * * *